United States Patent Office 3,644,292
Patented Feb. 22, 1972

3,644,292
ORGANO MERCAPTO-ANTIMONY COMPOUND AS POLYCONDENSATION CATALYSTS
Mary J. Stewart, Media, and John A. Price, Swarthmore, Pa., assignors to FMC Corporation, Philadelphia, Pa.
No Drawing. Filed Nov. 27, 1968, Ser. No. 779,595
Int. Cl. C08g 17/015
U.S. Cl. 260—75 R    6 Claims

ABSTRACT OF THE DISCLOSURE

Process for preparing linear polyesters comprising carrying out an ester-interchange reaction between a diol and a lower dialkyl ester of a saturated aromatic dicarboxylic acid or carrying out a direct esterification reaction between a diol and a saturated aromatic dicarboxylic acid and then polycondensing the reaction product thereof in the presence of a catalytic amount of a mercapto-antimony catalyst selected from the group consisting of compounds represented by the general formula:

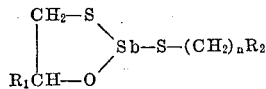

This invention relates to an improved method for the preparation of linear polyesters. More particularly, it relates to an improved polycondensation catalyst for use in the manufacture of highly polymeric linear polyesters.

It is known that linear polyesters can be prepared from a suitable ester of a dicarboxylic acid or a dicarboxylic acid by initially reacting such a material with a diol. When an ester of a dicarboxylic acid is used as a starting material, it is first reacted with a diol in the presence of a transesterification catalyst by means of an ester-interchange reaction; whereas, when a dicarboxylic acid is used as a starting material, it is first subjected to a direct esterification reaction with a diol in the presence of what is generally called a first stage catalytic additive or ether inhibitor. In either instance, the resulting reaction product which may be, in general, described as a polyester prepolymer, is then polycondensed in the presence of a polycondensation catalyst to form a polyester resin.

In the case of the transesterification method of preparing polyethylene wherein ethylene glycol is reacted with dimethyl terephthalate, the first stage product of the transesterification reaction is generally described as being comprised mainly of bis(2-hydroxethyl) terephthalate. Whereas, the first stage reaction product of the direct esterification reaction between ethylene glycol and terephthalic acid is comprised of bis(2-hydroxyethyl) terephthalate along with substantial quantities of higher condensates of ethylene glycol and terephthalic acid. In particular, the product of the direct esterification reaction between ethylene glycol and terephthalic acid and the product of the transesterification reaction between dimethyl terephthalate and ethylene glycol can be described as bis(2-hydroxyethyl) terephthalate or a polycondensation product thereof, wherein the D.P. (degree of polymerization) varies from about 2 to about 6. However, for purposes of simplicity in describing the present invention, hereinafter the terms "polyester prepolymer" and "bis(2-hydroxyethyl) terephthalate" will both denote and include within their scope the product of the direct esterification reaction between terephthalic acid and ethylene glycol and the product of the transesterification reaction between dimethyl terephthalate and ethylene glycol as set forth above.

Heretofore, various materials have been suggested as polycondensation catalysts for polycondensing the polyester prepolymer products of both the transesterification method and direct esterification method of preparing polyester resins. However, in general, none of the substances that have been suggested as polycondensation catalysts heretofore have been completely satisfactory. For example, many of the polycondensation catalysts of the prior art only catalyze the condensation reaction to a low degree and they do not promote the reaction rate sufficiently to be acceptable for commercial purposes. Obviously a short polycondensation time is desired. Therefore, such polycondensation catalysts of the prior art do not act to form polyester products having carboxyl contents as low as required for some resin uses, or molecular weights and melting points as high as desired.

From a commercial standpoint, it is essential that a polyester resin be produced in the shortest possible time and the desired degree of polymerization be obtained. A polyethylene terephthalate resin suitable for melt spinning should have a carboxyl content value of about below 50 equivalents per million grams (eq./$10^6$ gr. or meq./kg.), a birefringent melting point of about at least 258–260° C., and an intrinsic viscosity preferably not less than about 0.60 (determined in a 60% phenol and 40% tetrachloroethane solution, wt./wt., at 30° C.), in order for the filaments formed therefrom to possess a satisfactory level of hydrolytic stability, thermal stability, ultraviolet light stability and a high degree of tenacity which is necessary for the use of such filaments in the manufacture of fibers such as is used in wash and wear clothing. It is desirable to manufacture polyester resins which have carboxyl contents as close to zero as possible, because there is a generally recognized direct relationship between the carboxyl content of the polyester resin and the hydrolytic, thermal, and ultra-violet light stability of the filaments and films produced therefrom. In general, the higher the carboxyl content of the polyester resin, the less hydrolytic, thermal, and ultra-violet light stability is possessed by the resulting films or filaments.

It is an object of the present invention to prepare highly polymeric linear polyesters by a direct esterification reaction between a dicarboxylic acid and a diol or by an ester-interchange reaction between an ester of a dicarboxylic acid and a diol, so as to form a polyester prepolymer and then the polycondensation of the said polyester prepolymer in the presence of an improved polycondensation catalyst.

It is another object of the present invention to prepare a highly polymeric linear polyester resin by polycondensing bis(2-hydroxyethyl) terephthalate in the presence of an improved polycondensation catalyst.

These and other objects are accomplished in accordance with the present invention which involves a method for preparing highly polymeric linear polyesters wherein a lower dialkyl ester of a saturated aromatic dicarboxylic acid is reacted with a diol in the presence of an ester-interchange catalyst to form a polyester prepolymer or where a saturated aromatic dicarboxylic acid is reacted with a diol in the presence of a first stage additive to form a polyester prepolymer and where the resulting polyester prepolymer is polycondensed in the presence of a polycondensation catalyst, the improvement comprising carrying out the polycondensation of the polyester prepolymer in the presence of a catalytic amount of a mercapto-antimony catalyst selected from the group consisting of compounds represented by the general formula:

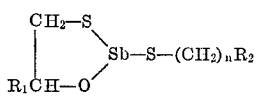

wherein $R_1$ represents a hydrogen or a lower alkyl radical having from 1 to 6 carbon atoms. $R_2$ represents a carboxyl radical or a hydroxyl radical or a mono-hydroxy substituted lower alkyl radical having from 1 to 6 carbon atoms and the letter $n$ is an integer of from 1 to 3 with the proviso that when $R_2$ is a carboxyl group, the alkali metal salt derivatives are also included.

For example, among the mercapto-antimony catalysts which can be used in accordance with the present invention are those represented by the following formulas:

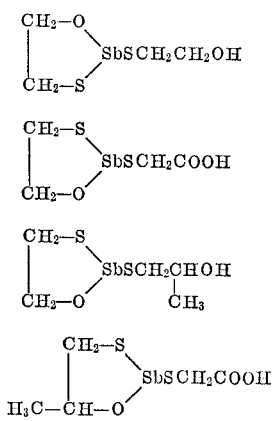

The terms "saturated aromatic dicarboxylic acid" and "lower dialkyl ester of a saturated aromatic dicarboxylic acid" are used herein to denote dicarboxylic acids or esters thereof which do not contain any olefinic unsaturation and wherein the alkyl groups contain from 1 to 6 carbon atoms. In accordance with the present invention, any of the well known saturated aromatic dicarboxylic acids or their esters can be used in the present method. For example, among those which can be used are isophthalic acid and terephthalic acid.

The term "diol" is used herein to denote glycols of the series $HO(CH_2)_nOH$ wherein $n$ is 2 to 10.

The preparation of mercapto-antimony compounds which come within the above description can be prepared by processes such as disclosed in U.S. Pat. 3,317,576, granted May 2, 1967.

The preparation of polyesters via the ester-interchange reaction is generally carried out with a molar ratio of glycol, such as ethylene glycol, to a dialkyl terephthalate, such as dimethyl terephthalate, of from about 1:1 to about 15:1, respectively, but preferably from about 1.5:1 to about 2.6:1. The transesterification reaction is generally carried out at atmospheric pressure in an inert atmosphere such as nitrogen, initially at a temperature range of from about 125° C. to about 250° C. but preferably between about 150° C. and 200° C. in the presence of a transesterification catalyst. During the first stage of this reaction, methyl alcohol is evolved and is continuously removed by distillation. After a reaction period of about one to two hours, the temperature of the reaction mixture is raised to from about 200° C. to about 300° C. for approximately one to three hours in order to complete the reaction so as to form the desired polyester prepolymer and distill off any excess glycol.

Any known suitable transesterification or ester-interchange catalyst, for example, lithium hydride or zinc acetate, can be used to catalyze the present transesterification reaction. Generally, the transesterification catalyst is used in concentrations of from about 0.01% to about 0.20%, based on the eight of the dialkyl terephthalate used in the initial reaction mixture.

Similarly, the preparation of polyester resins via the direct esterification reaction is generally carried out with a molar ratio of glycol, such as ethylene glycol, to a dicarboxylic acid, such as terephthalic acid, of from about 1:1 to about 15:1, but preferably about 1.5:1 to about 2.6:1. The direct esterification step is generally carried out at temperature ranging from about 180° C. to about 280° C. in the absence of an oxygen containing atmosphere at atmospheric or elevated pressure for about two to four hours to form the desired polyester prepolymer. For example, the reaction may be carried out in an atmosphere of nitrogen.

Any known suitable first stage direct esterification step catalytic additive may be used in the direct esterification step of the present method. For example, calcium acetate or triethylamine may be used. The first stage catalytic additives are generally used in concentrations ranging from $5 \times 10^{-5}$ mole to about $5 \times 10^{-2}$ mole of catalytic additive per mole of terephthalic acid present in the initial terephthalic acid-glycol reaction mixtures.

The polycondensation step of the present invention is accomplished by adding a mercapto-antimony compound of the present method to a polyester prepolymer or bis(2-hydroxyethyl) terephthalate and heating the blend thereof under reduced pressure within the range of from about 0.05 mm. to 20 mm. of mercury while being agitated at a temperature of from about 260° C. to about 325° C. for from two to four hours. Also, if indicated, the subject polycondensation catalysts can be added to the reactants before the prepolymer is formed.

The polycondensation catalysts of the present invention are generally employed in amounts ranging from about 0.01% to about 0.2%, based on the weight of the polyester prepolymer to be polycondensed. Usually, it has been found that from about 0.01% to about 0.1% of the subject polycondensation catalyst is preferred in most instances. Higher or lower concentrations of the present polycondensation catalysts can also be used in the subject polycondensation reaction. However, when concentrations less than the above are used, their effectiveness is generally reduced, whereas if concentrations greater than this are used, no further improvement in the present method or desired product is generally obtained.

The following examples of several preferred embodiments will further serve to illustrate the present invention. All parts are by weight unless otherwise indicated.

EXAMPLE I

A mixture comprising 600 grams of dimethyl terephthalate, 396 grams of ethylene glycol, and 0.24 gram of lithium hydride was charged into a reaction vessel equipped with a nitrogen inlet, heating means and stirring means. The reaction mixture was agitated and heated at atmospheric pressure at 198° C. under a nitrogen blanket. The reaction mixture was held at about 198° C. for about two hours, during which time by-product methyl alcohol was distilled off. Then the temperature of the reaction mixture was allowed to rise to 230° C. over a period of about one hour to distill off any remaining by-product methyl alcohol and excess ethylene glycol and form the polyester prepolymer comprised mainly of bis(2-hydroxyethyl) terephthalate. The prepolymer product was allowed to cool under an atmosphere of nitrogen.

EXAMPLE II

Fifty grams of the prepolymer product of Example I was mixed with 0.02 gram of a mercapto-antimony compound having the formula:

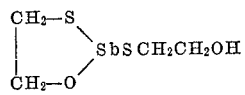

and placed in a reaction vessel. This mixture was heated at about 280° C. under reduced pressure of from about 0.05 to about 0.1 mm. of mercury while under agitation for about two hours to bring about polycondensation of the prepolymer product of Example I and formation of a polyester resin. The polyester resin product had an intrinsic viscosity of 0.76, a carboxyl content value of 10 (meq./kg.) and a melting point of about 263° C.

EXAMPLE III

A blended mixture comprising 474 grams of terephthalic acid, 288 mls. of ethylene glycol, and 149 mls. of triethylamine was charged into a reaction vessel equipped with a nitrogen inlet, a Dean-Stark separating apparatus, heating means, and stirring means. The reaction mixture was agitated and the temperature was raised to about 197° C. under a nitrogen blanket at atmospheric pressure. At about 190° C. a water-triethylamine azeotropic mixture started to distill off. The azeotropic mixture was continuously separated by means of the Dean-Stark apparatus, and the triethylamine recovered was continuously returned to the reaction vessel. The reaction mixture became almost clear. Then the temperature was allowed to rise to about 230° C. over a one hour period to form a polyester prepolymer. The prepolymer product was allowed to cool under an atmosphere of nitrogen.

EXAMPLE IV

Fifty grams of the prepolymer product of Example I was mixed with 0.02 gram of a mercapto-antimony compound having the formula:

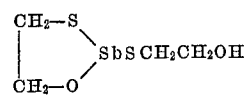

and placed in a reaction vessel. This mixture was heated at about 280° C. under reduced pressure of from about 0.05 to about 0.1 mm. of mercury while under agitation for about two hours to bring about polycondensation of the prepolymer product of Example I had formation of a polyester resin. The polyester resin product had an intrinsic viscosity of 0.65, a carboxyl content value of 10 (meq./kg.) and a melting point of about 262° C.

The intrinsic viscosity of the polyester resin products of the above examples were measured in a 60% phenol-40% tetrachloroethane solution (wt./wt.) at 30° C. The other analytical values expressed were obtained by conventional laboratory procedures.

The results in the above examples indicate that the subject mercapto-antimony compounds in general facilitate the preparation of and enhance the polyester resins produced. Through the use of the present method, polyester resins are obtained in a very short period of time and are characterized by low carboxyl values, high melting points, and high molecular weights as indicated by the intrinsic viscosity values.

We claim:

1. In a process of preparing linear polyester resins wherein a lower dialkyl ester of a saturated aromatic dicarboxylic acid is reacted with a glycol represented by the formula $HO(CH_2)_nOH$ wherein $n$ is 2 to 10 in the presence of an ester-interchange catalyst to form a polyester prepolymer or where a saturated aromatic dicarboxylic acid is reacted with a glycol represented by the formula $HO(CH_2)_nOH$ wherein $n$ is 2 to 10 in the presence of a first stage catalytic additive to form a polyester prepolymer and where the resulting polyester prepolymer is then polycondensed in the presence of a polycondensation catalyst, the improvement comprising carrying out the polycondensation of the said polyester prepolymer in the presence of a catalytic amount of a mercapto-antiomy catalyst selected from the group consisting of the compounds represented by the formulas:

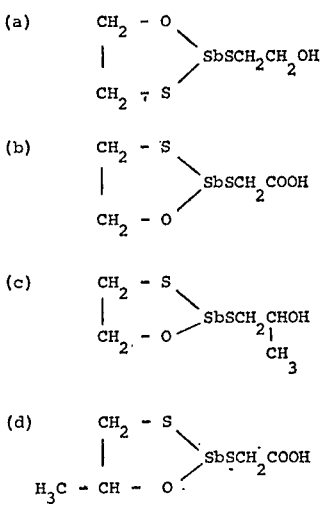

2. The process of claim 1 wherein the mercapto-antimony compound is present in a concentration within a range from about 0.01% to about 0.2% based on the weight of the polyester prepolymer.

3. The process of claim 1 wherein the mercapto-antimony compound is:

4. The process of claim 1 wherein the mercapto-antimony compound is:

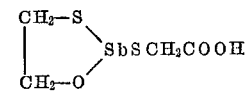

5. The process of claim 1 wherein the mercapto-antimony compound is:

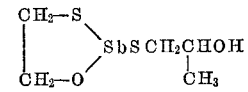

6. The process of claim 1 wherein the mercapto-antimony compound is:

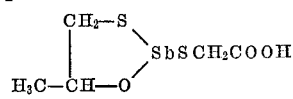

References Cited

UNITED STATES PATENTS

| | | | |
|---|---|---|---|
| 3,317,576 | 5/1967 | Malz et al. | 260—446 |
| 3,408,333 | 10/1968 | Tiedtke et al. | 260—75 |
| 3,415,787 | 10/1968 | Carlson et al. | 260—75 |

WILLIAM H. SHORT, Primary Examiner

L. P. QUAST, Assistant Examiner

UNITED STATES PATENT OFFICE
CERTIFICATE OF CORRECTION

Patent No. 3,644,292    Dated 2/22/72

Inventor(s) Mary J. Stewart and John A. Price

It is certified that error appears in the above-identified patent and that said Letters Patent are hereby corrected as shown below:

Col. 4, line 15, "eight" should read --weight--; line 23, "temperature" should read --temperatures--; line 29, delete "step"; line 36, "mixtures" should read --mixture--. Column 5, line 55, "had" should read -- and --; line 68, "eseter" should read --ester--. Col. 6, line 11, "antiomy" should read -- antimony --.

Signed and sealed this 18th day of July 1972.

(SEAL)
Attest:

EDWARD M. FLETCHER, JR.
Attesting Officer

ROBERT GOTTSCHALK
Commissioner of Patents